United States Patent Office 2,927,934
Patented Mar. 8, 1960

2,927,934

MODIFIED-HYDROCARBON RESIN ESTERS

Frank P. Greenspan, Williamsville, and Rupert E. Light, Jr., Kenmore, N.Y., assignors to Food Machinery and Chemical Corporation, San Jose, Calif.

No Drawing. Application August 20, 1956
Serial No. 605,210

5 Claims. (Cl. 260—410)

This invention relates to synthetic esters useful in the formation of coating compositions, and particularly to synthetic esters of certain modified hydrocarbon resins with fatty acids, useful in the preparation of varnishes, enamels and the like.

It has long been desired to adapt the low cost and readily available hydrocarbons and their relatively low molecular weight polymers for use in the formation of high quality coatings, binders and the like. However, these materials generally exhibit poor physical properties and poor adhesion to many surfaces, and furthermore they previously have resisted attempts to improve them in these respects.

It is a feature of this invention to provide low cost, modified-hydrocarbon esters of fatty acids, which esters are soluble in hydrocarbon solvents and compatible with a variety of resins, for example nitrogen resins and alkyd resins.

It is a further feature of this invention to provide such esters which comprise unusually high proportions of inexpensive and versatile fatty acids, and which are useful in the preparation of hard and tough, chemical and light resistant coatings which adhere well to many surfaces.

The esters of this invention are the reaction products of fatty acids with specially modified hydrocarbons, namely Diels Alder epoxidized polycyclopentadienes. The modified polycyclopentadienes useful in forming the ester are prepared by reacting of Diels Alder diunsaturated polycyclopentadienes containing 3 to 6 cyclopentadiene units, with an epoxidizing reagent, preferably a lower aliphatic peracid. The epoxidized polycyclopentadienes contain epoxy oxygen groups which are highly reactive with carboxylic acid groups present in the fatty acid, and accordingly they enter readily into the esterification reaction.

In the preferred embodiment of this invention, the esters are prepared by reaction of the modified polycyclopentadiene with unsaturated fatty acids, e.g., the drying oil fatty acids. These esters are drying compounds which convert, upon being subjected to the action of air or at room or elevated temperatures, to hard and tough, alkali resistant coatings. The esters prepared by reaction of the modified polycyclopentadiene with a saturated fatty acid are non-drying compounds which can be applied as thermoplastic coatings or blended with thermosetting resins to produce thermoset coatings.

Both the drying and non-drying esters compare favorably with the prior art esters, for example the esters of the low molecular weight polyhydroxy alcohols or of the more expensive high molecular weight synthetic polyhydroxy reaction products of epichlorohydrin with polyphenols, even being superior to them in some respects. Thus in common with the indicated esters of synthetic high molecular weight polyhydroxy compounds, they exhibit superior alkali resistance, adhesion, color and chemical resistance properties. However, they also exhibit the particular advantages over these materials of inherent hardness, color stability under outdoor exposure, compatibility with aliphatic solvents and the ability to form high gloss and hardness coatings, e.g. baked enamels, with minimum amounts of expensive nitrogen resins.

The polycyclopentadiene employed in forming the present esters is prepared by the heat polymerization of cyclopentadiene or dicyclopentadiene and is represented by the following formula

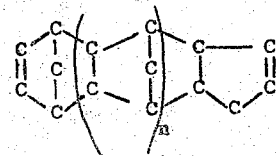

where $n=1$ to 4.

The alkylated cyclopentadienes, e.g. methyl cyclopentadiene, likewise are useful in preparing the polymers. The heat polymerization suitably is carried out by refluxing the cyclopentadiene or dicyclopentadiene at a temperature of about 145° to 220° C. for approximately 15 to 20 hours, and separating the product from unreacted monomer and dimer by distilling off these impurities at about 170° C. and 100 mm. of mercury. Alternately the heat polymerization can be conducted under pressure in the neighborhood of 100 pounds in a pressure vessel. This effects considerable savings in time, decreasing reaction times generally to about 4 to 5 hours.

The modified polycyclopentadiene, hereinafter referred to as epoxidized polycyclopentadiene, is prepared by reacting the diunsaturated polycyclopentadiene with an epoxidizing reagent, preferably a lower aliphatic peracid, which is liquid at or about room temperature. The peracid may be preformed or may be formed in situ in the reaction medium from the corresponding acid and hydrogen peroxide. In the case of the preformed peracid the reaction suitably is conducted by introducing the polycyclopentadiene into a reaction vessel and adding about one mole of the peracid thereto slowly and with stirring, at a temperature of about 35° C. to about 40° C. Following addition of all the peracid the temperature preferably is raised to from about 45° C. to about 55° C., and maintained there until the peracid is substantially completely consumed.

In the case of the in situ peracid reaction, the polycyclopentadiene, about 0.25 to 1.0 mole of aliphatic acid based on the amount of unsaturation in the polycyclopentadiene to be reacted, and in the case of aliphatic acids other than formic a strong acid catalyst for peracid formation, are introduced into a reaction vessel. A typical procedure employing acetic acid comprises adding to this, with stirring, about one mole of hydrogen peroxide based on the unsaturation in the polycyclopentadiene to be reacted. During addition of the hydrogen peroxide the temperature of the reaction mixture suitably is maintained at from about 45° C. to about 55° C. and following addition of the hydrogen peroxide the temperature is raised to from about 60° C. to about 65° C., where it is maintained until the hydrogen peroxide and peracid formed are consumed.

It is preferred to employ an inert organic solvent, for example chloroform, benzene and the like in the reaction mixture as such a solvent minimizes breakdown of the epoxy rings formed and represses formation of side products. The epoxidized polycyclopentadiene prepared as described above suitably is removed from the reaction mixture by washing out impurities with a 10% water solution of sodium sulfate. Where an organic solvent is employed in the reaction, it is removed from the product at reduced pressures.

The epoxidized polycyclopentadiene contains up to 2 epoxy groups, each of which is reactive with 2 carboxylic acid groups, and accordingly the epoxidized polycyclopentadiene has a maximum functionality of 4 in the esterification. It should be noted that the epoxy rings, in cases when hydrolysis conditions are encountered in the epoxidation, convert to hydroxy and sometimes acyloxy groups, each epoxy group being converted to two hydroxy or acyloxy groups. As the hydroxy groups have a functionality of one for reaction with the carboxylic acid and the acyloxy groups under ester interchange conditions likewise are reactive with one ester forming group, this breakdown of epoxy groups results in the production of groups which do not substantially lower the functionality of the epoxidized polycyclopentadiene.

In cases where the stoichiometric amount of epoxidizing reagent is employed in the epoxidation, the epoxidized product will have a functionality approaching the theoretical maximum of 4, whereas when less than the stoichiometric amount of peracid is employed, the functionality of the product will be correspondingly lower. In this connection it is important that the epoxidized polycyclopentadiene have a functionality of at least 2 in its reaction with the fatty acid, and accordingly amounts of epoxidized reagents should be employed which will product a product having this functionality for the esterification. The actual functionality of a given epoxidized polycyclopentadiene can be determined readily by simple stoichiometric calculations based on the molecular weight and the epoxy oxygen and hydroxy contents of the material. The molecular weight of the epoxidized material can be determined readily by standard freezing point determination methods. The epoxy oxygen content can be determined with generally adequate accuracy by the ether-HCl method of Swern et al., see Swern et al., Anal. Chem., 19, 414–15 (1947), in the present case by predissolving the sample in benzene. However, as a practical matter in the case of the fully epoxidized product, in the neighborhood of 30% of the epoxy oxygen present is sterically hindered and is not readily determinable by this method. Accordingly, where it is desired to analyze a fully epoxidized product for epoxy oxygen it is preferred to ring open the epoxy oxygen rings with sulfuric acid and to analyze the ring opened product for hydroxy content as described below. The oxirane oxygen content can be calculated readily from the hydroxy content. The hydroxy content can be determined by the lithium aluminum anhydride method, see Organic Analysis, Interscience Publishers, vol. II, 137–141 (1954).

The present ester is formed by reacting the epoxidized polycyclopentadiene together with a fatty acid, preferably in a proportion of about 50–85 parts by weight of the fatty acid to about 50–15 parts by weight of the epoxidized polycyclopentadiene. At acid levels above about 85% the ester formed is soft and unsuited for many applications, whereas at acid levels below 50% the ester exhibits tendencies toward brittleness.

The acidity of the fatty acid or fatty acid mixture employed in forming the ester must be substantially equal or less than that which will neutralize the basic, e.g. epoxy and hydroxy, groups in the epoxidized polycyclopentadiene. This is for the known reason that coating resins having free acid present in them are alkali sensitive. On the other hand, the presence of free epoxy or hydroxy groups is not detrimental, even being of advantage in regard to stability of the ester and in promoting adhesion. The selection of proper acids to be employed from the point of view of acid equivalency can be accomplished readily by determining the equivalent weight of the epoxidized polycyclopentadiene to be reacted and choosing acids which will have a combined acidity below this equivalence.

The mono- or polycarboxylic fatty acids generally may be employed in forming the ester. As regards the monocarboxylic acids, the lower fatty acids, for example butyric, pentanoic and the like, may be employed as well as the higher molecular weight acids, for example the fatty acids having in the neighborhood of 20 to 24 carbon atoms. The preferred monofunctional fatty acids are the higher fatty acids, that is the fatty acids containing approximately 12 to 22 carbon atoms, which are generally obtained from naturally occurring glycerides. Polycarboxylic fatty acids, which crosslink the polycyclopentadiene molecules, thereby increasing the molecular weights and viscosities of the esters, likewise may be employed in preparing the esters, provided they are not employed in an amount to cause premature crosslinking and therefore gelation. Examples of suitable polycarboxylic acids are maleic acid or the polymerized fatty acids, such as the dibasic and tribasic C-36 and C-54 acids.

Unsaturated fatty acids useful in preparing the preferred drying esters of this invention are the drying and semi-drying oil acids. Typical unsaturated fatty acids and oils in which they occur are shown in the following table, Table I.

TABLE I

| Acid | Double bonds per molecule | Typical oils in which they occur |
|---|---|---|
| Oleic | 1 | Soybean, sesame, palm. |
| Linoleic | 2 | Soybean, linseed, safflower. |
| Linolenic | 3 | Linseed, perilla. |
| Eleaostearic | 3 | Tung, oiticica. |

Other common oils and the unsaturated fatty acids which may be derived from them are enumerated in Laboratory Letters, Spencer Kellogg & Sons, Inc., pp. 108–110 (1949).

Fatty acids useful in preparing the non-drying ester are the various saturated fatty acids, as well as fatty acids which contain a small amount of unsaturation insufficient for drying. Examples of suitable saturated fatty acids are, butyric, caproic, caprylic, capric, lauric, myristic, palmitric, stearic, arachidic, behenic and lignoceric.

Esterification of fatty acids with the herein epoxidized polycyclopentadienes takes place readily, reaction times being considerably less than those encountered with the polyhydroxy compounds of the prior art. This is believed to be due to the high degree of reactivity of the epoxy group with acids, and accordingly it is preferred to employ epoxidized polycyclopentadienes containing at least about 2 to 4% of oxirane oxygen.

A suitable esterification method which can be employed in most instances with the present epoxidized polycyclopentadiene-fatty acid systems comprises the closed kettle fusion method. In this method the ingredients are mixed in a vessel equipped with a mechanical stirrer, heating elements, means for bubbling nitrogen through the reaction batch and a vent to the atmosphere, and the mixture is heated at about 250° C. with stirring and under a nitrogen atmosphere for in the neighborhood of 2 hours. Completion of the reaction is indicated by a lowering of the acid number of the reaction batch to a level of about 10 or below. Alternate esterification methods which can be employed suitably are the closed kettle azeotropic method and the open kettle method.

A modification of these esterification techniques, which is of particular advantage when it is desired to react fully an epoxidized polycyclopentadiene having an esterification functionality of 4 comprises adding to the esterification system a catalyst such as lithium hydroxide or trimethylammonium hydroxide, and conducting the reaction for longer periods of time, for example about 4–5 hours.

The esters are soluble in the various inexpensive mineral spirits, those mineral spirits having an aliphatic structure, as well as those having an aromatic structure, being effective as solvents for the esters. The esters are also soluble in other organic solvents, for example benzene, toluene, xylene and the like and films of these esters can be applied from solution in any of these solvents.

The present esters can be compounded with other ingredients to enhance their properties as coatings. They are highly compatible materials and can be blended with a wide variety of resins, for example phenol or amine aldehyde resins, alkyd resins, resin gums and the like, or with suitable plasticizers. The esters further may be blended with drying or semi-drying oils to form oleoresinous compositions which dry to excellent coatings. Likewise pigments and dyes can be incorporated in solutions of the esters to provide suitably colored coatings. Furthermore the epoxidized polycyclopentadiene employed in forming the ester can be replaced in part with various polyhydroxy or polyepoxy materials which are reactive with the fatty acids. This provides for internal modification of the ester molecule, and therefore modification of the coatings formed from the ester.

Deposits of the preferred drying esters, compounded or uncompounded, dry by oxidative crosslinking to form infusible and insoluble, hard and tough alkali resistant coatings. The drying can be effected at room temperature by incorporation of common drying catalysts, for example cobalt, manganese and the like or it can be accelerated with or without addition of a catalyst by application of heat such as by baking the deposited film at temperatures in the neighborhood of 100 to 200° C. for a short time.

The non-drying esters can be applied as coatings in the absence of thermosetting resins, in which case they provide waxlike to hard and tough thermoplastic coatings. However, frequently these esters are compounded with thermosetting resins such as phenol or amine aldehyde resins, alkyd resins, or the drying esters of this invention. These compositions can be converted to a thermoset condition through the crosslinking of the thermosetting resin, with the non-drying ester providing a high degree of alkali resistance and toughness in the resulting coating.

The present esters have application in a variety of coating applications, particularly where their high hardnesses and alkali resistances are of special value. Thus they are useful in forming coatings on various cements and plasters, as well as on metals and on wood. They normally are applied as solutions in organic solvents. They are useful also, however, in the formation of such resinous products as linoleums and laminated structures.

The following examples are given by way of illustration only and are not to be construed as limiting the reaction conditions, reaction ingredients, compounds or methods of use thereof which are within the scope of the present invention.

*Example 1*

170 g. of an epoxidized Diels Alder polycyclopentadiene containing 8% epoxy oxygen as determined by the ether-HCl method and having a molecular weight of approximately 253, 165 g. of dehydrated castor oil acid and 165 g. of Empol 1022 were mixed in a 4-necked flask equipped with a mechanical stirrer, a thermometer, a nitrogen inlet, a small vent and a heating mantle. The Empol 1022 is a mixture of polymerized unsaturated C–18 acids and is composed of about 75% of unsaturated C–36 dibasic acid and about 22% of C–54 tribasic acid, plus 3% of monomer. This material is produced by Emery Industries Inc. of Cincinnati, Ohio. The reaction batch was heated with stirring and under a nitrogen atmosphere over a period of 20 minutes to a temperature of 250±5° C. where it was maintained for two hours. At the end of this time the flask and its contents were cooled and a 60% solids solution of the reaction product was prepared in mineral spirits B.

80 g. of this solution, 20 g. of Melmac 243–3 and 0.05 g. of a 6% solution of manganese octoate were then mixed and the resulting solution was permitted to stand for 24 hours. The Melmac 243–3 is a 60% solids solution in aromatic solvents of a melamine-formaldehyde thermosetting resin, and is produced by the American Cyanamid Company of New York, N.Y. This solution then was coated with a wet film applicator onto glass, clean 30 gauge tin and solvent-sanded 20 gauge steel plates. The wet film thicknesses were 1.5 mil, and the dried films measured 1 mil in thickness. The coatings were air dried for one hour, baked at 150° C. for 30 minutes, and then were permitted to stand for 24 hours. Following this they were evaluated. See Table II for results.

*Example 2*

40 g. of the epoxidized polycyclopentadiene of Example 1 was reacted, as described in that example, with 30 g. of soya fatty acids and 30 g. of Empol 1022. A solution of 83.5 of the product and 16.5 of mineral spirits B was then prepared.

0.84 g. of 6% cobalt naphthenate, 0.17 g. of 6% manganese naphthenate and 1.15 g. of 24% lead naphthenate were added to this solution. Films of the solution then were coated onto glass, tin and steel plates as described in Example 1, and the films were air dried at room temperature for 72 hours following which they were evaluated. See Table II for results.

*Example 3*

35 g. of an epoxidized Diels Alder polycyclopentadiene containing 6.4% epoxy oxygen as determined by the ether-HCl method and having a molecular weight of approximately 290, 30 g. of dehydrated castor oil acid and 35 g. of tung oil acid were reacted as described in Example 1. Following completion of the reaction the flask and its contents were cooled, and the contents were dissolved in naphthyl mineral spirits to provide a 60% solution.

The above solution was coated onto glass, steel and tin plates as described in Example 1, and the coatings were air dried for one hour and then baked at 150° C. for 40 minutes. The baked coatings then were permitted to stand at room temperature for 24 hours and evaluated. See Table II for results.

*Example 4*

0.05 g. of a 6% solution of cobalt octoate was added to 10 g. of the resin ester solution of Example 3 and the resulting solution permitted to stand for 24 hours. The solution then was coated on glass, tin and steel plates as described in Example 1, and the coatings were air dried for six days. Immediately following this drying period the films were evaluated. See Table II for results.

*Example 5*

35 g. of an epoxidized polycyclopentadiene containing 6.85% of epoxy oxygen, as determined by the ether-HCl method, and 1.2% of hydroxy, as determined by the lithium aluminum anhydride method, and 65 g. of dehydrated castor oil were reacted as described in Example 1, and a 60% solution of the reaction product in naphthyl mineral spirits was prepared. 80 g. of this solution, 20 g. of Melmac 243–3 and 0.10 g. of a 6% solution of manganese octoate were mixed, and the resulting solution was permitted to stand for 24 hours and coated onto glass, tin and steel plates as described in Example 1. These coatings were dried for one hour, and then baked at 150° C. for 30 minutes, following which they were permitted to stand for another 24 hours and evaluated. See Table II for results.

*Example 6*

40 g. of an epoxidized polycyclopentadiene containing 6.4% epoxy oxygen, as determined by the ether-HCl method, and having a molecular weight of about 250, and 60 g. of a maleic anhydride modified linseed acid derived by saponification of Kellin, were reacted as described in Example 1. The Kellin is linseed oil modified with maleic anhydride, and has an acid number of 12-17, an iodine number of 140-150, and a saponification number of 210-220. This product is sold by Spencer Kellogg & Sons, Inc. of Buffalo, N.Y. The saponified Kellin was prepared by conventional saponification procedures. A 60% solution of the product in naphthyl mineral spirits was prepared as described in Example 1, and permitted to stand for 24 hours, coated onto glass, tin and steel plates as described in that example. The coatings were dried for one hour and were baked for 50 minutes at 150° C. These coatings were permitted to stand for 24 hours and then evaluated. See Table I for results.

*Example 7*

28 g. of the epoxidized polycyclopentadiene of Example 1 were reacted, as described there, with 35 g. of dehydrated castor oil acids and 35 g. of Empol 1022. 97 g. of the product were dissolved in 65 g. of mineral spirits B. 80 g. of the above solution then were blended with 20 g. of Melmac 243-3 and 0.05 g. of 6% manganese octoate. The resulting solution was permitted to stand for 24 hours, following which it was coated onto glass, tin and steel plates with a 2 mil weight film applicator. The coatings were dried for one hour and baked at 150° C. for 30 minutes to provide coatings having a thickness of 1 mil. The coatings then were evaluated. See Table II for results.

*Example 8*

208 g. of the epoxidized polycyclopentadiene employed in Example 6 were reacted, as described in Example 1, with 150 g. of dehydrated castor oil acid and 150 g. of Empol 1022. A solution of 495 g. of the product then was prepared in 330 g. of mineral spirits B. 85 g. of the above solution were then blended with 15 g. of Melmac 243-3 and 0.05 g. of 6% manganese octoate. The resulting solution was coated onto glass, tin and steel plates as described in that example. See Table II for results.

*Example 9*

57 g. of stearic acid, and 5.7 g. of trimethylbenzylammonium hydroxide were heated in a four-necked flask equipped with a mechanical stirrer, a thermometer, a nitrogen inlet, a small vent and a heated mantle, for one-half hour at 110° C. 12.3 g. of an epoxidized polycyclopentadiene having a molecular weight of about 250 and having an oxirane oxygen content of 12.4% as determined by ring opening the epoxy oxygen ring and analyzing for glycol by the lithium aluminum anhydride method, was added to this solution with stirring. The resulting solution then was heated under nitrogen at 135° C. for 12 hours under constant stirring. The reaction mixture then was cooled and dissolved in a 500 ml. of a 50–50 benzene-ether mixture, and washed with 500 ml. of 2% sulfuric acid maintained at about 0° C. The aqueous layer was discarded and the organic solution dried over anhydrous sodium carbonate. The product then was stripped of solvent at reduced pressure, following which it was dissolved in mineral spirits B to provide a 60% solution. 7 g. of this solution and 3 g. of Melmac 243-3 were mixed, and the resulting solution then was cooled onto tin, glass and steel plates as described in Example 1. The coatings were dried for one hour and baked at 200° C. for 30 minutes. The coatings were then permitted to stand for 24 hours at room temperature, and were evaluated. See Table II for results.

*Example 10*

84 g. of oleic acid and 3.3 g. of lithium hydroxide were heated to 120° C. in a four-necked flask equipped with mechanical stirrer, a nitrogen inlet, a thermometer, a small vent and a heating mantle. 12.4 g. of epoxidized polycyclopentadiene employed in Example 9 was dissolved in 30 ml. of xylene, the resulting solution was added to the reaction mixture in the flask and the mixture was heated under nitrogen with stirring for 4½ hours at 250° C. At the end of this time the flask and its contents were cooled, and the contents were treated as described in Example 9 to purify and separate the product, and a 60% solids solution of the product was prepared in mineral spirits B. 7 g. of this solution and 3 g. of Melmac 243-3 then were mixed, and the resulting solution was coated onto tin, glass and steel plates as described in Example 1. The coatings were permitted to stand for one hour and baked at 200° C. for 30 minutes, were permitted to stand for 24 hours at room temperature, and were evaluated. See Table II for results.

*Example 11*

For purposes of comparison with coatings prepared from the esters of the present invention, a coating was prepared from commercial alkyd resin. 100 g. of Glyptal 1247 and 0.06 g. of cobalt contained in a 6% solution of cobalt octoate were mixed and coated onto glass, tin and steel plates as described in Example 1. The Glyptal is an alkyd resin composition used in making coatings and binders and is produced by the General Electric Company of Schenectady, New York. Following deposition of the coatings they were air dried for one hour and then baked at 120° C. for 2 hours. The baked coatings then were permitted to stand at room temperature for 24 hours and evaluated. See Table II for results.

TABLE II

| Sample | Acid No. | Gardner[1] Color | Gardner[2] viscosity | Sward Rocker Hardness on Steel | Impact[3] on Steel in Lbs. | Chemical resistance[4] (18 Hrs.) | | | Flexibility[5] on Tin Plates Passed, inches | Description of Film on Glass |
|---|---|---|---|---|---|---|---|---|---|---|
| | | | | | | 5% NaOH | 5% HCl | Toluene | | |
| Ex. 1 | 8.6 | 12–13 | W | | 160 | 1 | 1 | 1 | ⅛ | Hard, tough, v. good adhesion. |
| Ex. 2 | 3.85 | | M | 47.3 | | Poor | Very good | | | Hard, good adhesion to the plates. |
| Ex. 3 | 2.4 | 10 | X–Y | 60 | 160 | 2–3 | 1–2 | 1–2 | ⅛ | Hard, tough, good adhesion. |
| Ex. 4 | 2.4 | 10 | X–Y | 50 | | | | | ¾ | Do. |
| Ex. 5 | 8.4 | 10–11 | C | 50 | 80–100 | 1–2 | 1–2 | 1–2 | ⅛ | Do. |
| Ex. 6 | 4.1 | 10 | K | 60 | | 1 | 1 | 1–2 | ⅛ | Hard, good adhesion. |
| Ex. 7 | 10.2 | 12–13 | Z–1 to Z–2 | 42 | 160 | 1 | 1 | 1 | ⅛ | Tough, good adhesion. |
| Ex. 8 | 5.0 | 13–14 | X–Y | 55 | | 1 | 1 | 1 | ⅛ | Hard, flexible, good adhesion. |
| Ex. 9 | 0.6 | | | 50–55 | | 1 | | | ³⁄₁₆ | Hard, flexible, good adhesion. |
| Ex. 10 | 1.8 | | | 55 | | 1 | | | ⅛ | Hard, flexible, fair adhesion. |
| Ex. 11 | | | | 30 | | 10 | 1 | 1 | | Med. hard, tough, flexible. |

[1] Color of a 60% solution in naphthyl mineral spirits.
[2] Viscosity of a 60% solution in naphthyl mineral spirits.
[3] Gardner 160 inch pound variable impact tester.
[4] 1 represents complete resistance to attack, 10 complete solution, of films laid down on steel plates.
[5] Plates folded 180° around a mandrel of indicated diameter; coating did not crack.

What is claimed is:

1. An ester of 50 to 15 parts of an epoxidized Diels Alder polycyclopentadiene having an epoxy functionality of 2 to 4 and having 3 to 6 cyclopentadiene units, and 50 to 85 parts of a fatty acid from the group consisting of the monomers and polymers of the fatty acids having 4 to 24 carbon atoms.

2. An ester of 50 to 15 parts of an epoxidized Diels Alder polycyclopentadiene having an epoxy functionality of 2 to 4 and having 3 to 6 cyclopentadiene units, and 50 to 85 parts of a fatty acid from the group consisting of the monomers and polymers of the fatty acids having on the order of 18 carbon atoms.

3. An ester of 50 to 15 parts of an epoxidized Diels Alder polycyclopentadiene having an epoxy functionality of 2 to 4 and having 3 to 6 cyclopentadiene units, and 50 to 85 parts of oleic acid.

4. An ester of 50 to 15 parts of an epoxidized Diels Alder polycyclopentadiene having an epoxy functionality of 2 to 4 and having 3 to 6 cyclopentadiene units, and 50 to 85 parts of dehydrated castor oil acid.

5. An ester of 50 to 15 parts of an epoxidized Diels Alder polycyclopentadiene having an epoxy functionality of 2 to 4 and having 3 to 6 cyclopentadiene units, and 50 to 85 parts of stearic acid.

References Cited in the file of this patent

UNITED STATES PATENTS

| | | |
|---|---|---|
| 2,395,452 | Bruson | Feb. 26, 1946 |
| 2,398,889 | Gerhart | Apr. 23, 1946 |
| 2,414,089 | Bruson | Jan. 14, 1947 |
| 2,426,725 | Bruson | Sept. 2, 1947 |
| 2,608,550 | Rowland | Aug. 26, 1952 |
| 2,731,502 | Smith | Jan. 17, 1956 |
| 2,736,730 | Kleiman | Feb. 28, 1956 |
| 2,739,161 | Carlson | Mar. 20, 1956 |

OTHER REFERENCES

King: Journal of The Chem. Soc. (London), 1943, pp. 37–38.